Nov. 15, 1927.
F. PATTERSON
CHICKEN FEEDER
Filed Jan. 20, 1927
1,649,250
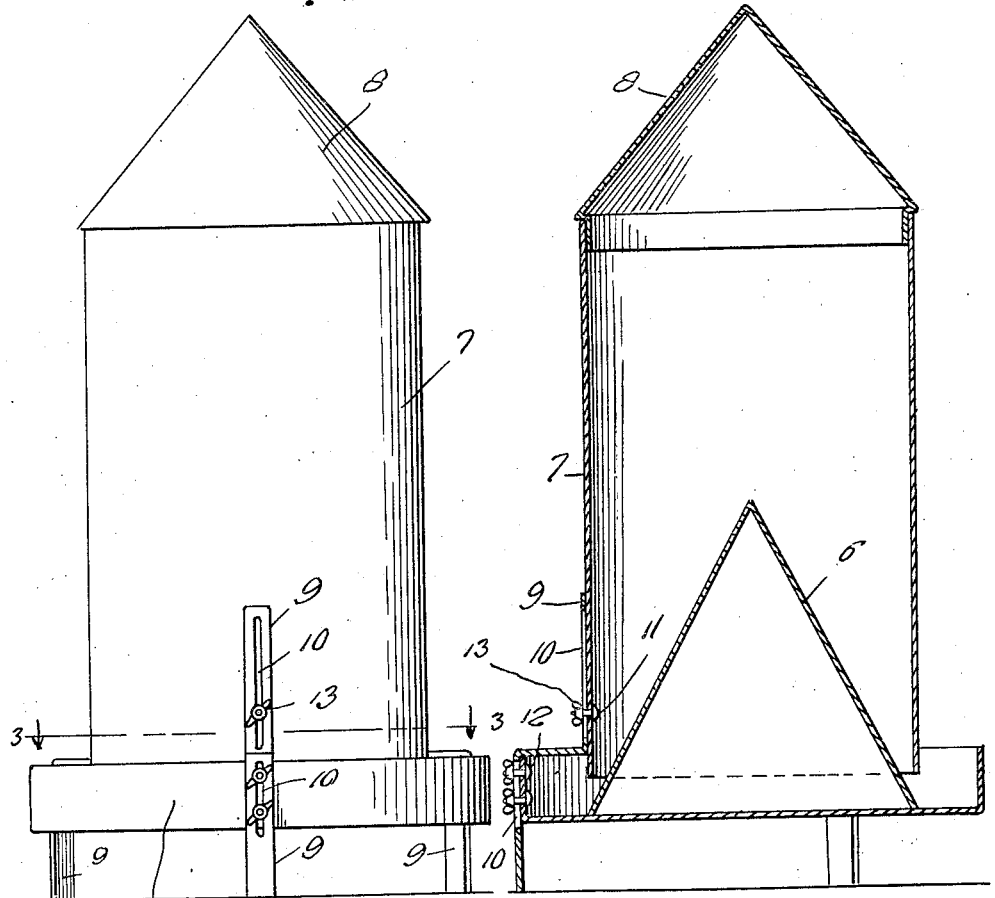
Inventor
Frank Patterson,
By Clarence A. O'Brien
Attorney Patented Nov. 15, 1927.

1,649,250

UNITED STATES PATENT OFFICE.

FRANK PATTERSON, OF GENESEO, NEW YORK.

CHICKEN FEEDER.

Application filed January 20, 1927. Serial No. 162,364.

This invention relates to new and useful improvements in chicken feeders and aims to provide a highly novel, simple, and inexpensive feeder that may be readily knocked down for shipping or cleaning purposes, and wherein the feed supply hopper may be adjusted with respect to the feed pan so as to control the depth of the feed within the pan.

A further and important object is to provide a feed trough wherein the means for permitting the adjustment of the hopper is also constructed for supporting the same at a desired elevation and to permit the feeder to be supported horizontally regardless of the inclination of the floor or ground surface.

With the foregoing and other objects in view as the nature of the invention is better understood, the same comprises the novel form, combination and arrangement of parts hereinafter more fully described, shown in the accompanying drawing and claimed.

In the drawing wherein like reference characters indicate corresponding parts throughout both of the views Figure 1 is a side elevation of my improved feeder.

Figure 2 is a detail vertical section thereof, and

Figure 3 is a horizontal section taken substantially upon the line 3—3 of Figure 1.

Now having particular reference to the drawing, my novel feeder consisting of a circular feed pan 5 within the center of which is arranged a vertically extending conical distributor 6. Arranged within the pan around said distributor 6 is an open ended cylindrical feed hopper 7, within the upper open end of which is removably arranged a conical lid 8 such a shape being for the purpose of preventing the chickens from roosting thereon.

The invention further consists of a plurality of double L-shaped feeder supporting legs 9. As clearly indicated in Figure 2, the intermediate portions of these legs traverse the space between the rim of the pan 5 and the hopper 7, while the ends thereof have flush engagement with the outer side of the pan 5 and the outer surface of said hopper. Furthermore the end portions of these legs are longitudinally slotted as at 10—10, and projecting therethrough are bolts 11 and 12 arranged through openings in the hopper 7 and the pan side wall respectively for receiving at their outer ends wing nuts 13. Obviously in view of this particular character of leg, the hopper 7 may be raised or lowered with respect to the pan 5 for regulating the depth of the feed therein. Furthermore, by reason of the adjustable connection between the legs and the pan 5, the feeder may be supported in a true horizontal position upon the floor or ground by adjusting the legs at various positions with respect to each other.

In view of the foregoing description when considered in conjunction with the accompanying drawing, it will at once be apparent that I have provided a highly novel, simple, and efficient chicken feeder that is well adapted for all the purposes heretofore designated, even though I have herein shown and described the invention as consisting of certain detail structural elements it is nevertheless to be understood that some changes may be made therein without affecting the spirit and scope of the appended claim.

Having thus described the invention, what I claim as new and desire to secure by Letters Patent is:—

In a chicken feeder of the class described, a feed pan, a vertical conical distributor arranged centrally within the pan, an open ended hopper arranged above the distributor within the pan, a closure for the open upper end of the hopper, a plurality of relatively double L-shaped legs for supporting the feeder and securing the hopper within the pan in spaced relation with respect to the same, the end portions of the legs being disposed flush against the outer surfaces of the hopper and the rim of the pan, the intermediate portion of each leg extending horizontally across the space between the upper edge of the pan and the hopper, the end portions of the legs being formed with longitudinal slots, bolts carried by the hopper and the rim of the pan for disposition through the slotted end portions of the legs and a nut threaded on the threaded end of the bolt for securing the hopper and feed pan in various adjusted positions.

In testimony whereof I affix my signature.

FRANK PATTERSON.